United States Patent [19]

Birr

[11] 4,269,519
[45] May 26, 1981

[54] SAFETY ARRANGEMENT FOR A MIXER CATCH

[75] Inventor: Hans J. Birr, Wuppertal, Fed. Rep. of Germany

[73] Assignee: Vorwerk & Co. Interholding GmbH, Wuppertal, Fed. Rep. of Germany

[21] Appl. No.: 110,388

[22] Filed: Jan. 7, 1980

[30] Foreign Application Priority Data

Jan. 12, 1979 [DE] Fed. Rep. of Germany ....... 2900987

[51] Int. Cl.³ .................... B01F 13/04; A47J 27/09
[52] U.S. Cl. ................................ 366/206; 99/348; 241/37.5; 366/349
[58] Field of Search ............ 366/347, 349, 601, 205, 366/206, 314; 99/348; 241/37.5, 199.12, 282.1, 282.2

[56] References Cited

U.S. PATENT DOCUMENTS 4,108,054  8/1978  Klocker et al. .................. 99/348

*Primary Examiner*—Philip R. Coe
*Attorney, Agent, or Firm*—Michael J. Striker

[57] ABSTRACT

A safety arrangement for a mixer latch utilized to prevent an undesirable unlatching of the mixer container when a mixer motor is still running after termination of mixing processing. The safety arrangement includes a locking arm to close the mixer including a catch at an end thereof, a base plate having an opening to receive the catch in a locking position, a motor contactor electrically connected to a mixer motor and having an axis. A cam with a curved outer surface is mounted on the axis of the motor contactor and is adapted to operatively engage a link mounted on the base plate for a swingable movement by rotation of the axis of the motor contactor. The link is operatively connected to a lever formed with an opening arranged to engage the catch of the locking arm when the latter is in a locking position.

4 Claims, 3 Drawing Figures

4,269,519

SAFETY ARRANGEMENT FOR A MIXER CATCH

BACKGROUND OF THE INVENTION

The present invention is directed to household appliances. More particularly, the present invention relates to safety arrangements for locking devices serving to close containers of cooking mixers.

Conventional mixers, in order to assure the safety of the device during operation, include control contactors or motor controllers connected into the motor current circuit. These motor contactors serve to shut down the motor when the container is mechanically unlatched, so that a user cannot accidentally come in contact with the moving mixer blades or, if the container has been detached, with the rotating coupling which drives the mixer blades.

However, in the type of mixer which also cooks the contents, this kind of construction has certain disadvantages. Since the container is almost airtight the heating of food in the container causes a slight internal overpressure. When the closure of the container is unlatched the motor is disconnected, at the same time. For a brief time period thereafter the liquid or other contents of the mixer then continue to be mixed and to rotate in the container, and since the closure is no longer held tightly closed the liquid, aided by the overpressure, may run out of the container. This can lead to burn injuries for the user.

SUMMARY OF THE INVENTION

It is an object of the present invention to provide an improved safety arrangement for locking devices utilized to latch the container of mixers used for cooking purposes.

Another object of this invention is to provide a safety arrangement for a locking device which assures that the mixer motor is turned off before the container locking device is mechanically released.

These and other objects of the present invention are achieved by an arrangement including a locking arm connected to a closure of a container, having a catch at one end thereof, a motor contactor electrically connected to the motor, a base plate having an opening on a side wall thereof to receive the catch of the locking arm, a cam mounted on the axle of the motor contactor and having an outer surface, a link adapted to pivot into and out of the engagement with the cam surface and operatively connected to a lever which is swingable against the opening in the base and which is released when the motor contactor is in off position, and projects in its swingable movement the catch of the locking arm when the motor contactor is on. The catch is provided with a projecting nose and with a rear portion and the lever is formed with an opening, the opening engages the rear portion of the catch by a swinging action of the lever operatively connected to the axis of the motor contactor. A spring is arranged on the base plate to bias the swingable lever.

It has been found advantageous that in the construction according to the present invention to the container can be removed from the mixer unit only after the motor has come to a complete stop, since in this manner any overflow of hot liquid is avoided.

DETAILED DESCRIPTION OF THE INVENTION

Figure 1:
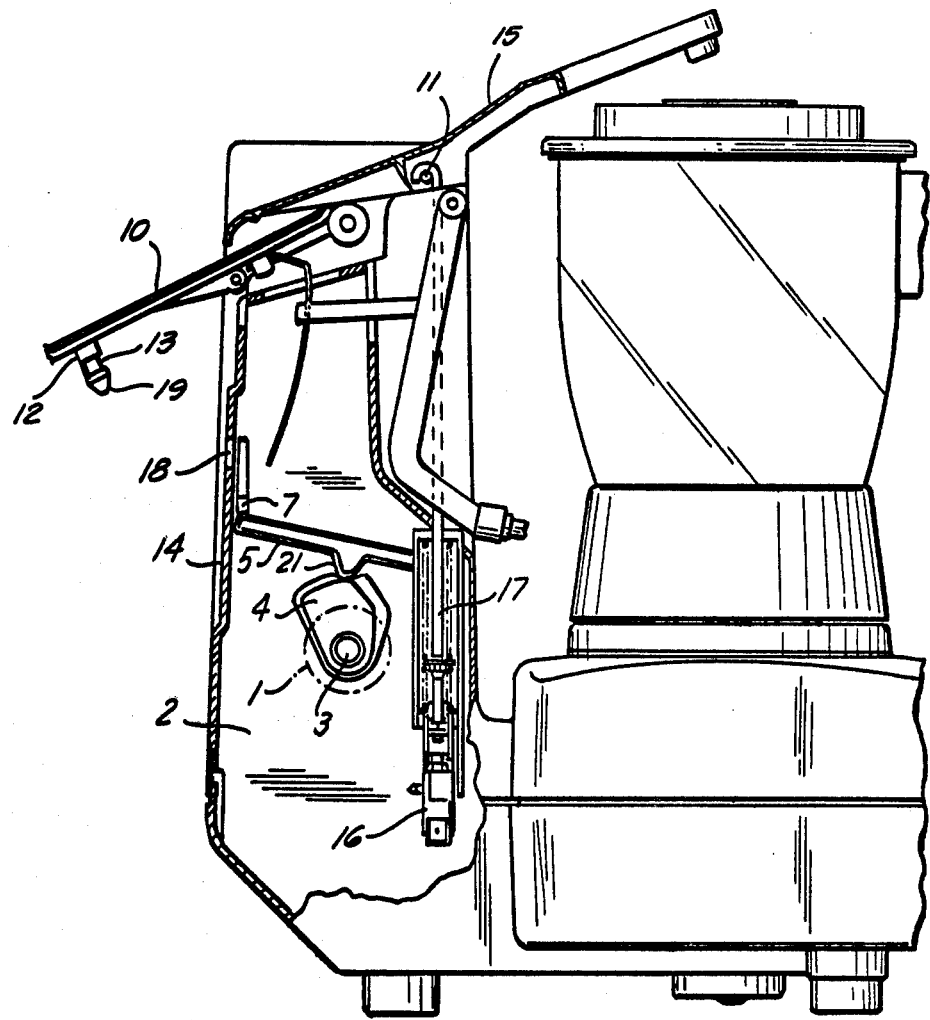
FIG. 1 is a side view of the mixer in an unlatched position with a motor contactor in an off position.

Referring to the drawings, a mixer 14 includes a container or bowl 11 the top closure of which is latched closed. FIG. 1 depicts an unlatched position of the locking device of the present invention. A locking arm 10 is pivotally mounted on an upper end of a base 2 and is operatively connected to a supporting lever 15 pivotally supported on a pin 11. The mixer is provided with a motor (not shown) which is electrically connected to a motor contactor 1 having an axis 3 carrying a cam 4. Cam 4 is formed with a cam track or curved surface and is adapted to rotate together with the motor contactor axis. A link 5 is mounted on the base 2 and is arranged to swing in a vertical plane. FIG. 1 depicts the locking device in an open position when the motor contactor is in off position. The base 2 is an integral box-like casing in a side wall of which an opening 18 is formed.

An additional controller contactor 16 is operatively connected to a rod 17 which in turn is connected to the pin 11 and is pushed in a vertical direction to actuate the supporting lever 15. The controller 16 is electrically connected to the motor (not shown) and to the motor contactor 1 in the same motor current circuit as the motor contactor 1. The locking arm 10 carries a catch 12 with an undercut rear portion 13 and a projecting nose 19. This catch extends through the opening 18 when the mixer is in latched position, shown in FIG. 2. The link 5 is provided with a lug 21 which in the unlatched position shown in FIG. 1 remains in a groove 22 provided in the curved surface of cam 4.

Figure 2:
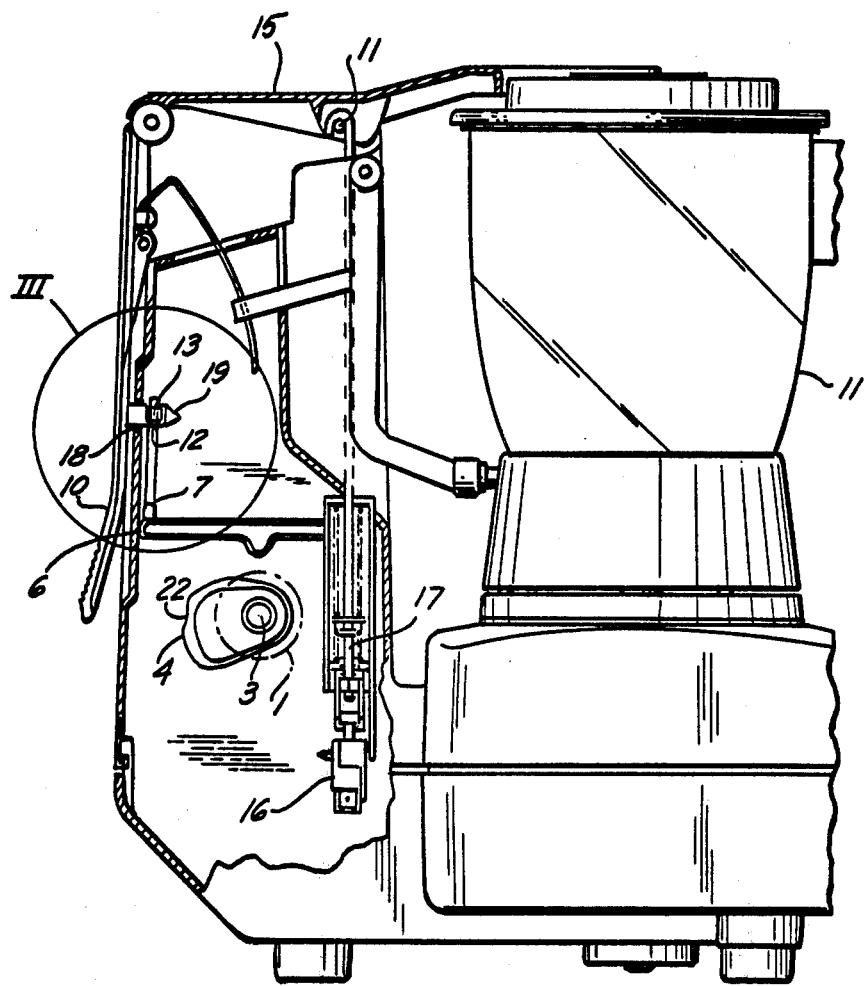
FIG. 2 is a side view of the mixer in the latched position and with the motor contactor in an on position.
Figure 3:
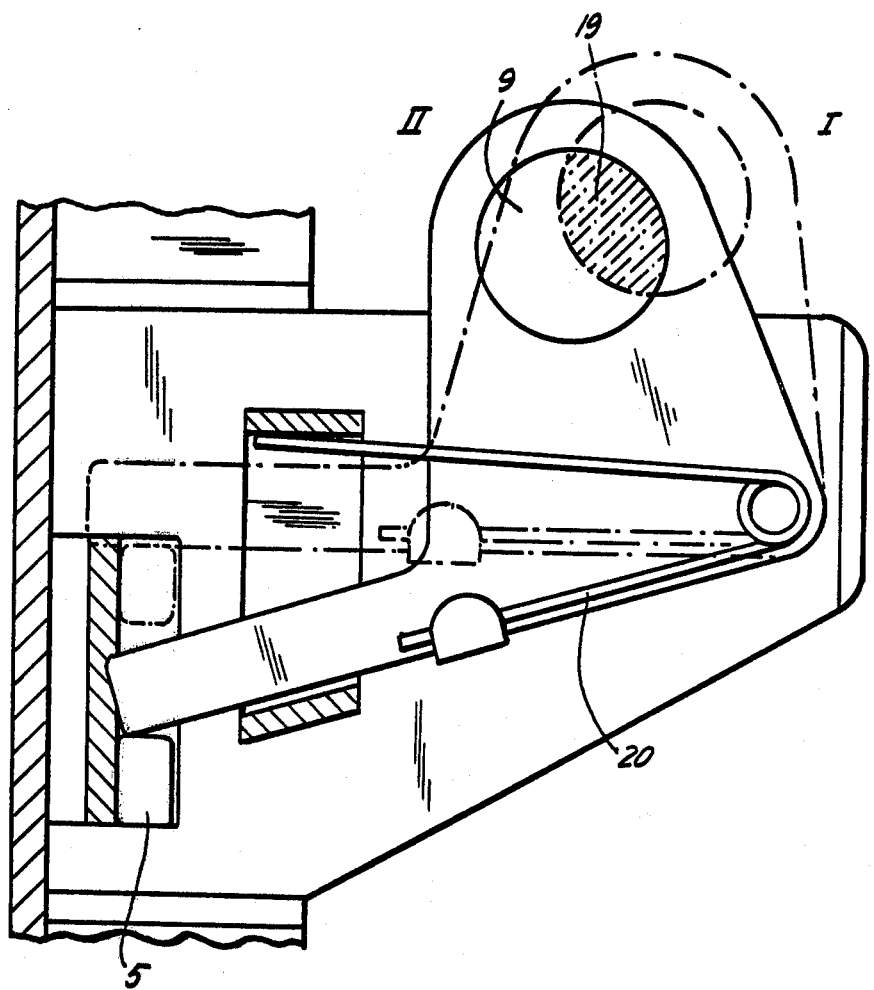
FIG. 3 is an enlarged section view of FIG. 2 showing a swingable lever in two positions.

In FIG. 2 the locking arm 10 and the supporting lever 15 are in a locked position. When the motor together with the motor contactor 16 are turned on, the cam 4 rotates in counterclockwise direction (in the plane of the drawing). This action causes the movement of the link 5 the end of which is connected to the lever 7 and therefore actuates the lever 7 which swings from a position I to a position II as shown in FIG. 3. The lever 7 is provided with an opening or eye 9. A spring 20 is mounted on the base 2 to bias the lever 7 in its swingable movement. In operation the catch 12 with nose 19 and the undercut rear portion 13 which is projected through the opening 18 into the base 2 further projects through the opening 9 of lever 7 which engages in the undercut of the portion 13 when the motor and the motor contactor are in on position. This position is shown as II in FIG. 3. The nose 19 is shown in the drawing as a hatched portion in overlapping position of lever 7 between the I and II positions. The locking arm 10 thus can not swing to its open position when the motor is running, as can be seen in FIG. 1. When the controller 16 is open rod 17 moves upwardly during unlatching of the container. In the event that the motor contactor 1 is first related to the position shown in FIG. 2, the motor can nevertheless not start up because in the unlatched position of the container the controller 16 is in open position and interupts the motor circuit. In this position however, the container 11 can be latched. Although the opening 9 of lever 7 is in the position II of FIG. 3, an inclined surface 19 of the hose 12 presses against the edge of the opening 9; this pushes lever 7 against the force of spring 20 in the direction of position I of FIG. 3 and lets the opening 9 of lever 7 click into the undercut of the rear portion 13 of the catch.

It will be understood that each of the elements described above, or two or more together, may also find a useful application in other types of constructions differing from the types described above.

While the invention has been illustrated and described as embodied in a safety arrangement for a mixer latch it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A safety arrangement for a mixer latch to prevent a mixer container from being disconnected from the mixer when the mixer motor is running, comprising a locking arm adapted to close the mixer container, said locking arm being provided with a catch; a base on the container an opening in a side wall thereof to receive said catch; a motor contactor electrically connected to a mixer motor and having an axis; a cam mounted on said axis of said motor contactor, and being formed with a curved surface on an outer side thereof; a link mounted on said base and adapted to engage said curved surface for a swingable movement of said link in a vertical plane; and a lever pivotally mounted in said base and having an end operatively connected to said link, said lever being adapted to engage said catch while the latter projects into said opening of the base in the locking position of the latch.

2. The safety arrangement of claim 1, wherein said lever is formed with an opening and said catch is terminated with a nose which projects into said opening.

3. The safety device of claim 2, wherein said catch has a rear portion which is engaged by said opening when said motor contactor is in on position.

4. The safety device of claim 1, wherein said lever is biased by a spring.

* * * * *